June 1, 1954 R. H. SHEPPARD 2,679,792
TRIP SHANK PIVOT

Filed Sept. 25, 1952 2 Sheets-Sheet 1

INVENTOR
RICHARD H. SHEPPARD
BY Henry H Snelling
ATTORNEY

INVENTOR
RICHARD H. SHEPPARD
BY Henry H. Snelling
ATTORNEY

UNITED STATES PATENT OFFICE 2,679,792

TRIP SHANK PIVOT

Richard H. Sheppard, Hanover, Pa.

Application September 25, 1952, Serial No. 311,366

4 Claims. (Cl. 97—47.88)

This invention relates to trip shanks and has for its principal object the provision of a trip shank which will extend greatly the angle thru which the trip shank and the soil working tool carried thereby may turn in moving from normal to tripped position.

A further object of the invention is to substitute for the usual connector links a system of linkages which carry central pivots. This permits the outer or forward member of this centrally pivoted connector to ride forward on the boss of the trip shank and thus relieve strain on the cultivator mechanism. A still further object of the invention is to provide a particular type of centrally jointed connector in which the four transverse pivots are alined in such fashion that the sweep or shovel or other tool readily trips and even after it moves thru an angle in excess of 120° the spring rod can still restore the ground tool to original position just as soon as the cause of the tripping is removed.

A still further object of the invention is to provide connections between the usual spring rod and the trip shank carried tool which will provide reverse suck sufficiently positive to lift the entire gang assembly, of which the shovel, sweep or other tool is a member, completely out of the ground or at least sufficiently to clear any sub-surface obstruction such as a root, stump or stone and as soon as this obstruction is passed to restore to original normal operating position, such construction entirely avoiding the previous kinking of the single piece connecting rod of earlier devices.

Figure 1:
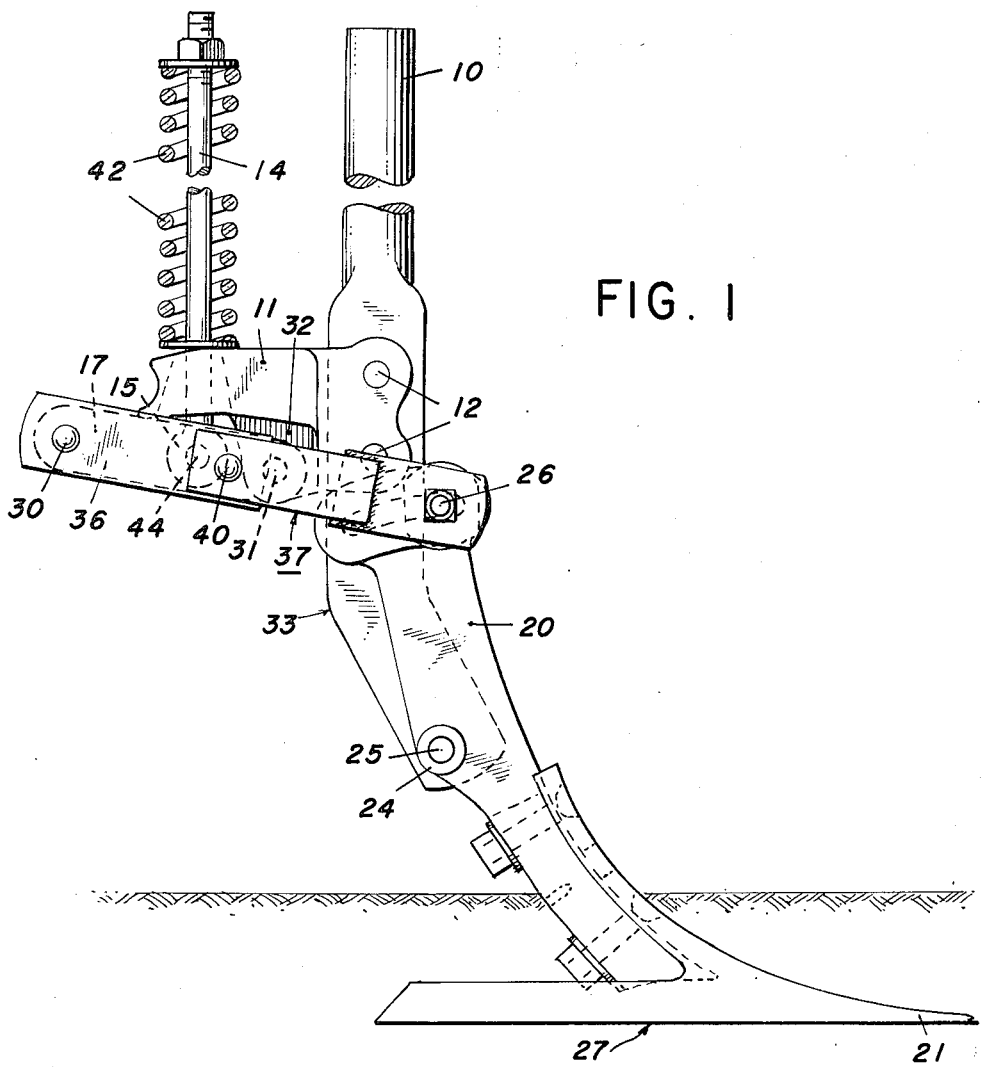
Figure 1 is a side elevation showing the parts in normal working position.

Certain of the parts are of old and well known construction. These include the standard 10 sometimes called the post foot or shank, the bracket 11 secured to the standard as by the rivets 12, the spring rod 14 having at its lower end an eye 15, the spring-urged links 17, the trip shank 20, and the ground working tool here shown as a sweep 21. The trip shank 20 has the usual boss 24 thru the center of which passes the pivot pin 25 which forms the axis about which the trip shank turns as it is tripped.

The bolt 26, in normal fashion, fastens the forward end of the connector to the top of the trip shank 20, but adjustment is made so that the bottom 27 of the sweep 21 is parallel to the ground level, usually about 2" below the surface, by turning the eccentric bushing 28.

The connector, which in the past has always been an elongated pair of links, is replaced in the present device by a centrally joined connector. The rear ends of this connector are pivoted to the spring-urged links 17 as by the bolt 30 so this bolt may turn, about the pivot 31 in a depending lug 32 of the bracket 11, downward thru an angle greater than a right angle; actually until the spring-urged links approach alinement with the bend 33 of the standard. The links 17 never touch this point 33, however, as might be indicated by Figure 2, because the links 17 are spaced apart a greater distance than the thickness of the lower flat portion of the standard.

At the forward end the connector is pivoted to the bolt 26 which therefore forms a knee joint between the connector and the trip shank 20. The connector consists of the rear links 36 and the forward links 37, the latter preferably formed by welding together the straps 38 and 39, as best seen in Figure 3, the purpose being to have less clearance between the connector members at the knee joint than near the loose rivets 40 which form the central joints of the connector.

It might be noted that the links 36 and 37, which form the connector, are never toggled because the spring 42 pulls the spring-urged links 17 upward at the pivot 30 and consequently the link 36 is lifted so that the axis of the pivot pin 30 is never above a plane thru the axis of the bolt 26 and the axes of the alined rivets 40. The axis of the stationary pivot 31 may be above this plane and likewise the axis of the pin 44 which joins the two links 17 to the eye 15 of the spring rod 14 may be on or near this plane.

Figure 3:
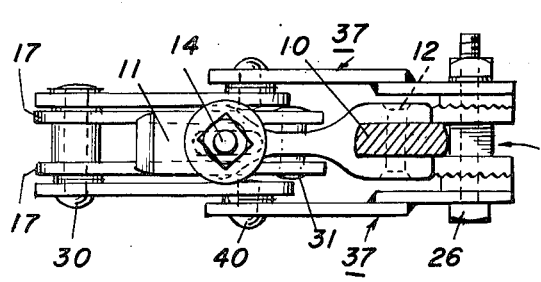
Figure 3 is a plan view looking downward upon the centrally jointed connector.

It is important that the distance from the knee joint 26 to the trip shank pivot 25 shall be less than the distance from the joint 26 to the loose rivets 40 which form the central joint of the connector so that as the rear link 36 of the connector strikes against the boss 24 on the trip shank, this link 36 will tend to slide forward on the boss as the tool moves downwardly and back to the position shown in Figure 3.

By this arrangement the spring 42 can move the tool downwardly and forwardly back to normal position, as shown in Figure 1, as soon as the obstruction is passed. The movement of the forward link 37 of the connector about the central joint 40 does add to the compression of the spring 42 and might even bend slightly the spring-rod 14 but the rebound of this rod aids the spring 42 in returning the two spring-urged links 17 from their over-center position thus aiding the shovel or sweep or other ground working tool to snap back into its normal operating position just as soon as the obstruction is cleared. Except for the central pivoting of the connector there would be greater danger of not only bending a single strap connector but causing a bending of the main shank 10 or the trip shank 20.

In operation the sweep 21, the bottom of which is normally horizontal, strikes an obstruction. As this sweep is bolted or otherwise secured to the trip shank 20 and as counter-clockwise movement about the main pivot 25 is impossible, the tip 28 of the sweep moves downward with respect to the stationary pivot 25. Knee joint 26 therefore moves forward and down and the forward link 37 of the connector also moves forward and down, pulling the rear pin 39 forward. Since such movement is resisted by the stationary pivot 31, the rear pivot 39 therefore moves almost vertically downward carrying with it the rear member 36 of the connector. The two spring-urged links turn in an arc about the pivot 31. This movement continues and as the connector strikes the boss 24 it yields centrally about the axis of the loose rivets 40, the link 36 continuing to move forward and the forward link 37 moving about the axis of these rivets to the position shown in Figure 2. When the obstruction is passed the highly compressed spring 42 urges rod 14 upward and the links 17 turn about the stationary pivot 31 in the bracket on the standard.

Figure 2:
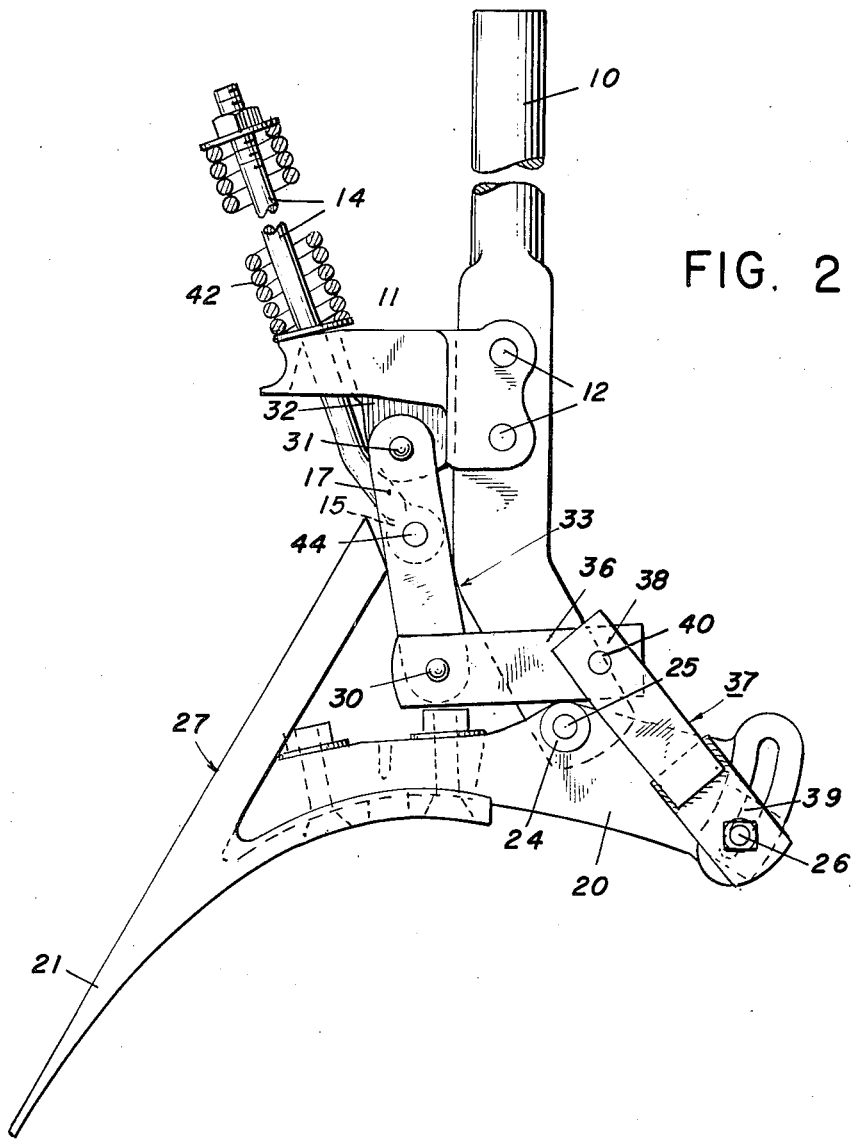
Figure 2 is a similar view showing the parts tripped.

In moving from the normal position shown in Figure 1 to the full tripped position in Figure 2 it will be noted that the bottom 27 of the sweep 21 moves thru an angle greater than 120° as against an angular movement of less than 80° provided by a similar device using a single link instead of the jointed link 36—37. The advantage is that in tripped position the tip 28 of the sweep is only 1¾" below its normal depth of 2" whereas with an angle of only 79°, permitted by a single link, the sweep would have gone 6" farther into the ground for a total of 8". This latter naturally would cause great strain on the entire cultivator mechanism and in addition would still leave some suck on the sweep 21 which would cause it to pull farther into the ground and increase the strain already on the trip shank and in fact on the entire mechanism. With the jointed link, as shown, there is a reverse suck on the sweep 21, as readily seen in Figure 2, and this is sufficiently positive to lift the entire gang assembly out of the ground.

Figure 4:
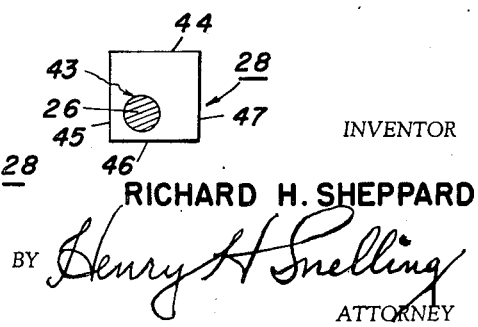
Figure 4 is a view of the leveling bushing.

The leveling of the bottom of the sweep or other soil working tool is readily and conveniently perfected by turning the square bushing 28 about the bolt before tightening. As best seen in Figure 4 the bushing has an eccentric hole 43 unequally spaced from the four faces, 44, 45, 46 and 47 in that order of distance, so precise leveling is easily arranged.

What I claim is:

1. In a mounting for a ground working tool of the type employing a standard, a trip shank pivoted to the standard adapted to carry a tool at its lower end, a spring-pressed rod, a spring-urged link pivoted at its front end to a pivot fixed with respect to the standard and having pivotal connection with the spring rod: a connector of two links having a central joint pivoted at its front end by a knee joint to the upper end of the trip shank above its pivot on the standard and pivoted at its rear end to the rear end of the spring-urged link, and an abutment in proximity to the trip shank pivot lying in the path of movement of the connector to engage the connector near its central joint thus causing the centrally connected links to turn about their common joint and assume an angle of less than 180° so as to permit the trip shank to move through a greater angle than if the connector were rigid.

2. The device of claim 1 in which the distance from the pivot of the trip shank on the standard to the knee joint, which pivots the connector to the trip shank, is less than the distance from said knee joint to the central joint of the connector, whereby the rear link of the connector will engage the abutment and slide thereon.

3. In combination, a standard, a trip shank pivoted near the bottom thereof to carry a soil working tool at its lower end, a two-link, centrally jointed connector pivoted to the shank near its upper end, a spring-urged link pivoted at one end to the connector and pivoted at the other end to a point fixed with respect to the standard, an abutment proximate the trip shank pivot on the standard, the position of the axis of the central joint of the connector being so chosen that the rear link of the connector will engage the abutment, whereby the tool carrying shank may move thru a considerable angle about its pivot on the standard after the connector strikes the shank pivot, by reason of the forward connector member turning about the joint axis after the rear connector member has reached the limit of its movement.

4. In an agricultural tool mounting of the type employing a standard, a trip shank pivoted to the standard and adapted to carry a tool at its lower end, a bracket extending rearwardly from the standard, a spring-pressed rod supported on said bracket, a pair of spring-urged links pivoted at their front ends to said bracket and having a pivotal connection with the spring-pressed rod, a pair of connectors each consisting of two links connected by a central joint, said connectors being pivoted at their front ends by knee joints to the trip shank above its pivot on the standard and pivoted at their rear ends to the rear ends of the spring-urged links by a common pivot, a boss surrounding the pivotal connection between the standard and the trip shank pivot, the distance from the knee joint axis to the axis of the pivot of the trip shank on the standard being less than the distance from the knee joint axis to the central joints of the connectors, and the axis of the pivots at the front ends of the spring-urged links lying above a plane passing thru the axis of the knee joints and the axis of the common pivot of the spring-urged links and the connectors, whereby when the tool strikes an obstruction and the trip shank turns about its pivot, the rear links of the connectors will engage the boss and will move forward as the trip shank turns farther about its pivot, breaking the central joints and therefore decreasing the obtuse angle between the two links of each connector, whereby the trip shank may move thru a total angle equal to that which it would turn if the connectors were solid bars plus the amount of decrease of the obtuse angle between the two links of the connectors from the normal angle of 180° before the connectors engage the boss.

References Cited in the file of this patent

UNITED STATES PATENTS

| Number | Name | Date |
| --- | --- | --- |
| 310,290 | Lewis | Jan. 6, 1885 |
| 620,717 | Moore | Mar. 7, 1899 |
| 1,209,095 | Williams | Dec. 19, 1916 |

FOREIGN PATENTS

| Number | Country | Date |
| --- | --- | --- |
| 108,615 | Australia | Sept. 21, 1939 |